United States Patent
Sun et al.

(10) Patent No.: US 10,719,926 B2
(45) Date of Patent: Jul. 21, 2020

(54) IMAGE STITCHING METHOD AND ELECTRONIC DEVICE

(71) Applicant: HUAWEI TECHNOLOGIES CO., LTD., Shenzhen (CN)

(72) Inventors: Rui Sun, Shenzhen (CN); Jiyong Jiang, Shanghai (CN); Feng Mao, Shanghai (CN); Ning Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 15/773,563

(22) PCT Filed: Nov. 5, 2015

(86) PCT No.: PCT/CN2015/093844
§ 371 (c)(1),
(2) Date: May 4, 2018

(87) PCT Pub. No.: WO2017/075779
PCT Pub. Date: May 11, 2017

(65) Prior Publication Data
US 2018/0330483 A1    Nov. 15, 2018

(51) Int. Cl.
*G06K 9/00* (2006.01)
*G06T 5/50* (2006.01)
(Continued)

(52) U.S. Cl.
CPC .............. *G06T 5/50* (2013.01); *G06T 7/33* (2017.01); *G06T 7/70* (2017.01); *G06T 2200/32* (2013.01); *G06T 2207/20221* (2013.01)

(58) Field of Classification Search
CPC ... G06T 5/50; G06T 7/70; G06T 2207/20221; G06T 7/33
See application file for complete search history.

(56) References Cited

U.S. PATENT DOCUMENTS 6,573,945 B1 * 6/2003 Wu ................... H04N 19/467
                                                    345/641
8,068,693 B2 * 11/2011 Sorek ................ G06T 3/4038
                                                    358/450
(Continued)

FOREIGN PATENT DOCUMENTS

CN        101504761 A       8/2009
CN        102467738 A       5/2012
(Continued)

OTHER PUBLICATIONS

Yuan Zhang et al.,"video stitch algorithm based on dynamic foreground extraction",2009 2nd International Congress on Image and Signal Processing,total 5 pages.
(Continued)

*Primary Examiner* — Amir Alavi
(74) *Attorney, Agent, or Firm* — Kilpatrick Townsend & Stockton LLP

(57) ABSTRACT

An image stitching method includes: obtaining a control object of a first image; obtaining a control object of a second image; identifying a same control object of the first image and the second image, and location information of the same control object, where the location information includes first location information and second location information, the first location information indicates a location of the same control object in the first image, and the second location information indicates a location of the same control object in the second image; and stitching the first image and the second image into a third image according to the location information of the same control object.

17 Claims, 10 Drawing Sheets

(51) Int. Cl.
*G06T 7/33* (2017.01)
*G06T 7/70* (2017.01)

(56) References Cited

U.S. PATENT DOCUMENTS

| | | | |
|---|---|---|---|
| 9,185,284 B2* | 11/2015 | Chao | H04N 5/23216 |
| 10,140,497 B1* | 11/2018 | He | G06K 7/1491 |
| 2002/0171745 A1* | 11/2002 | Ehrhart | G06K 7/10851 |
| | | | 348/231.3 |
| 2014/0214986 A1 | 7/2014 | Hwang et al. | |
| 2015/0154776 A1 | 6/2015 | Zhang et al. | |
| 2015/0256764 A1* | 9/2015 | Besson | H04N 5/2628 |
| | | | 348/50 |
| 2018/0330483 A1* | 11/2018 | Sun | G06T 5/50 |
| 2018/0364801 A1* | 12/2018 | Kim | G06T 19/006 |

FOREIGN PATENT DOCUMENTS

| | | |
|---|---|---|
| CN | 102708558 A | 10/2012 |
| CN | 103020938 A | 4/2013 |
| CN | 103514581 A | 1/2014 |
| CN | 103984502 A | 8/2014 |
| CN | 104103051 A | 10/2014 |
| CN | 104331872 A | 2/2015 |
| CN | 104346788 A | 2/2015 |
| CN | 104376531 A | 2/2015 |
| CN | 104427242 A | 3/2015 |
| CN | 104536658 A | 4/2015 |
| CN | 104680501 A | 6/2015 |

OTHER PUBLICATIONS

Qing shi et al.,"Research on Panorama Image Mosaic Technology Based on Corner Detection Registration", Microcomputer Applications vol. 27, No. 6, 2011,total 8 pages.

Chunguang Sui et al.,"Research on the Implementation and Related Problems of Digital Nautical Seamless Splicing", Science of Surveying and Mapping vol. 129 No. 14 Aug. 2004,total 6 pages.

* cited by examiner

```
          Great! Let's get together
                sometime

Well, how about today

See you at 12:00 pm

OK
```

October 10, 2015, 09:00 am

IMAGE STITCHING METHOD AND ELECTRONIC DEVICE

CROSS-REFERENCE TO RELATED APPLICATIONS

This application is a National Stage of International Application No. PCT/CN2015/093844, filed on Nov. 5, 2015, which is hereby incorporated by reference in its entirety.

TECHNICAL FIELD

Embodiments of the present invention relate to the field of image processing technologies, and in particular, to an image stitching method and an electronic device.

BACKGROUND

In the mobile Internet era, people usually take a screenshot on a mobile phone for sharing. However, when content of more than one screen needs to be shared, screenshots need to be consecutively taken for content in a plurality of screens. Operations are relatively complex, and readability is poor. Therefore, applications such as "long screenshot" and "scrolling screenshot" appear. Key experience of the long screenshot application or the scrolling screenshot application is whether a final stitched "long image" is accurate. However, for whether the long image can be stitched accurately, a key technology is to accurately identify an overlapped area between to-be-stitched screenshots, and remove the overlapped area for stitching.

An image comparison method is usually used in the prior art. Whether there is an overlapped area between the "bottom" of a screenshot (an (N−1)th screenshot) and the "top" of a next screenshot (an Nth screenshot) is analyzed pixel by pixel. According to the existing image comparison method, for a scenario using a solid-color chat background, an overlapped area between the two images can be accurately identified. However, once the user uses a non-solid-color chat background, a relative location of the "chat background" always changes, and the overlapped area between the two images cannot be found by using only the image comparison method. As a result, the stitched image has overlapped content, and accuracy of similar image stitching needs to be further improved.

SUMMARY

To accurately determine an overlapped area or content of to-be-stitched images, and resolve a problem of overlapped content in image stitching, embodiments of the present invention provide an image stitching technical solution, and the technical solution is as follows:

According to a first aspect, an embodiment of the present invention provides an image stitching method, including: obtaining a control object of a first image; obtaining a control object of a second image; identifying a same control object of the first image and the second image, and location information of the same control object, where the location information includes first location information and second location information, the first location information indicates a location of the same control object in the first image, and the second location information indicates a location of the same control object in the second image; and stitching the first image and the second image into a third image according to the location information of the same control object. Therefore, an overlapped area or content of the first image and the second image can be accurately identified. The first image and the second image are stitched into the third image according to location information of the overlapped area or content, and the obtained third image has no overlapped content, so as to improve accuracy of image stitching.

With reference to the first aspect, in a first possible implementation of the first aspect, the identifying a same control object of the first image and the second image, and location information of the same control object is specifically: obtaining location information of the control object of the first image in the first image; obtaining a first middle image according to the obtained control object of the first image and the location information of the control object of the first image in the first image; obtaining location information of the control object of the second image in the second image; obtaining a second middle image according to the obtained control object of the second image and the location information of the control object of the second image in the second image; comparing the first middle image with the second middle image, and determining a same control object of the first middle image and the second middle image; determining location information of the same control object in the first middle image; and determining location information of the same control object in the second middle image.

With reference to the first possible implementation of the first aspect, in a second possible implementation of the first aspect, the first middle image has a solid-color background, the second middle image has a solid-color background, and the background of the first middle image is the same as the background of the second middle image, so that a background image with personalized setting information in the first image and the second image can be prevented from affecting determining of the same control object of the first image and the second image. Therefore, accuracy of determining the same control object of the first image and the second image is improved.

With reference to the first possible implementation of the first aspect or the second possible implementation of the first aspect, in a third possible implementation of the first aspect, a size of the first middle image is the same as that of the first image, and a size of the second middle image is the same as that of the second image; the location information of the control object of the first image is the same as location information of a control object of the first middle image; and the location information of the control object of the second image is the same as location information of a control object of the second middle image, so as to improve accuracy of determining the same control object of the first image and the second image.

With reference to any one of the possible implementations of the first aspect, in a fourth possible implementation of the first aspect, the obtaining a first middle image according to the obtained control object of the first image and the location information of the control object of the first image in the first image, or the obtaining a second middle image according to the obtained control object of the second image and the location information of the control object of the second image in the second image includes:

if the control object is a text control, extracting a text of the text control, and laying out the text of the text control in a middle background image according to location information of the control object in an image to which the control object belongs; or if the control object is a non-transparent text control, laying out the non-transparent text control in a middle background image according to location information of the control object in an image to which the control object belongs; or if the control object is a transparent text control, extracting a text of the transparent text control, and laying out the text of the transparent text control in a middle background image according to location information of the control object in an image to which the control object belongs, or replacing the transparent text control with a color block image, and laying out the color block image in a middle background image according to location information of the text control in an image to which the text control belongs, where a size of the color block image is the same as a size of a non-transparent text control; or if the control object is a dynamic image control, replacing the dynamic image control with a static image, and laying out the static image in a middle background image according to location information of the dynamic image control in an image to which the dynamic image control belongs, where a size of the static image is the same as a size of the dynamic image control.

With reference to any one of the first aspect or the possible implementations of the first aspect, in a fifth possible implementation of the first aspect, the location information is coordinates information.

With reference to any one of the first aspect or the possible implementations of the first aspect, in a sixth possible implementation of the first aspect, the stitching the first image and the second image into a third image according to the location information of the same control object is specifically: obtaining a first to-be-stitched image according to the first location information, and stitching the first to-be-stitched image and the first image into the third image; or obtaining a second to-be-stitched image according to the second location information, and stitching the first image and the second to-be-stitched image into the third image.

According to a second aspect, an embodiment of the present invention provides an electronic device, including: an obtaining unit, configured to: obtain a control object of a first image, and obtain a control object of a second image; an identification unit, configured to identify a same control object of the first image and the second image, and location information of the same control object, where the location information includes first location information and second location information, the first location information indicates a location of the same control object in the first image, and the second location information indicates a location of the same control object in the second image; and a stitching unit, configured to stitch the first image and the second image into a third image according to the location information of the same control object. Therefore, the electronic device can accurately identify an overlapped area or content of the first image and the second image, and stitch the first image and the second image into the third image according to location information of the overlappped area or content. The obtained third image has no overlapped content. Therefore, accuracy of image stitching is improved.

With reference to the second aspect, in a first possible implementation of the second aspect, the identification unit is specifically configured to: obtain location information of the control object of the first image in the first image; obtain a first middle image according to the obtained control object of the first image and the location information of the control object of the first image in the first image; obtain location information of the control object of the second image in the second image; obtain a second middle image according to the obtained control object of the second image and the location information of the control object of the second image in the second image; compare the first middle image with the second middle image, and determine a same control object of the first middle image and the second middle image; determine location information of the same control object in the first middle image; and determine location information of the same control object in the second middle image.

With reference to the first possible implementation of the second aspect, in a second possible implementation of the second aspect, the first middle image has a solid-color background, the second middle image has a solid-color background, and the background of the first middle image is the same as the background of the second middle image, so that a background image with personalized setting information in the first image and the second image can be prevented from affecting determining of the same control object of the first image and the second image. Therefore, accuracy of determining the same control object of the first image and the second image is improved.

With reference to the first possible implementation of the second aspect or the second possible implementation of the second aspect, in a third possible implementation of the second aspect, a size of the first middle image is the same as that of the first image, and a size of the second middle image is the same as that of the second image; the location information of the control object of the first image is the same as location information of a control object of the first middle image; and the location information of the control object of the second image is the same as location information of a control object of the second middle image, so as to improve accuracy of determining the same control object of the first image and the second image.

With reference to any one of the possible implementations of the second aspect, in a fourth possible implementation of the second aspect, when obtaining the first middle image according to the obtained control object of the first image and the location information of the control object of the first image in the first image, or obtaining the second middle image according to the obtained control object of the second image and the location information of the control object of the second image in the second image, the identification unit is specifically configured to:

if the control object is a text control, extract a text of the text control, and lay out the text of the text control in a middle background image according to location information of the control object in an image to which the control object belongs; or if the control object is a non-transparent text control, lay out the non-transparent text control in a middle background image according to location information of the control object in an image to which the control object belongs; or if the control object is a transparent text control, extract a text of the transparent text control, and lay out the text of the transparent text control in a middle background image according to location information of the control object in an image to which the control object belongs, or replace the transparent text control with a color block image, and lay out the color block image in a middle background image according to location information of the text control in an image to which the text control belongs, where a size of the color block image is the same as a size of a non-transparent text control; or if the control object is a dynamic image control, replace the dynamic image control with a static image, and lay out the static image in a middle background image according to location information of the dynamic image control in an image to which the dynamic image control belongs, where a size of the static image is the same as a size of the dynamic image control.

With reference to any one of the second aspect or the possible implementations of the second aspect, in a fifth possible implementation of the second aspect, the location information is coordinates information.

With reference to any one of the second aspect or the possible implementations of the second aspect, in a sixth possible implementation of the second aspect, the stitching unit is specifically configured to: obtain a first to-be-stitched image according to the first location information, and stitch the first to-be-stitched image and the second image into the third image; or obtain a second to-be-stitched image according to the second location information, and stitch the first image and the second to-be-stitched image into the third image.

According to a third aspect, an embodiment of the present invention provides an electronic device, including: a memory, configured to store an instruction;

a processor, configured to invoke the instruction stored in the memory to perform the following steps: obtaining a control object of a first image, and obtaining a control object of a second image; identifying a same control object of the first image and the second image, and location information of the same control object, where the location information includes first location information and second location information; the first location information indicates a location of the same control object in the first image; and the second location information indicates a location of the same control object in the second image; and stitching the first image and the second image into a third image according to the location information of the same control object; and a display, configured to display the first image, the second image, and the third image.

Therefore, the electronic device can accurately identify an overlapped area or content of the first image and the second image, and stitch the first image and the second image into the third image according to location information of the overlapped area or content. The obtained third image has no overlapped content. Therefore, accuracy of image stitching is improved.

With reference to the third aspect, in a first possible implementation of the third aspect, when identifying the same control object of the first image and the second image, and the location information of the same control object, the processor is specifically configured to: obtain location information of the control object of the first image in the first image; obtain a first middle image according to the obtained control object of the first image and the location information of the control object of the first image in the first image; obtain location information of the control object of the second image in the second image; obtain a second middle image according to the obtained control object of the second image and the location information of the control object of the second image in the second image; compare the first middle image with the second middle image, and determine a same control object of the first middle image and the second middle image; determine location information of the same control object in the first middle image; and determine location information of the same control object in the second middle image.

With reference to the first possible implementation of the third aspect, in a second possible implementation of the third aspect, the first middle image has a solid-color background, the second middle image has a solid-color background, and the background of the first middle image is the same as the background of the second middle image, so that a background image with personalized setting information in the first image and the second image can be prevented from affecting determining of the same control object of the first image and the second image. Therefore, accuracy of determining the same control object of the first image and the second image is improved.

With reference to the first possible implementation of the third aspect or the second possible implementation of the third aspect, in a third possible implementation of the third aspect, a size of the first middle image is the same as that of the first image, and a size of the second middle image is the same as that of the second image; the location information of the control object of the first image is the same as location information of a control object of the first middle image; and the location information of the control object of the second image is the same as location information of a control object of the second middle image, so as to improve accuracy of determining the same control object of the first image and the second image.

With reference to any one of the possible implementations of the third aspect, in a fourth possible implementation of the third aspect, when obtaining the first middle image according to the obtained control object of the first image and the location information of the control object of the first image in the first image, or obtaining the second middle image according to the obtained control object of the second image and the location information of the control object of the second image in the second image, the processor is specifically configured to:

if the control object is a text control, extract a text of the text control, and lay out the text of the text control in a middle background image according to location information of the control object in an image to which the control object belongs; or if the control object is a non-transparent text control, lay out the non-transparent text control in a middle background image according to location information of the control object in an image to which the control object belongs; or if the control object is a transparent text control, extract a text of the transparent text control, and lay out the text of the transparent text control in a middle background image according to location information of the control object in an image to which the control object belongs, or replace the transparent text control with a color block image, and lay out the color block image in a middle background image according to location information of the text control in an image to which the text control belongs, where a size of the color block image is the same as a size of a non-transparent text control; or if the control object is a dynamic image control, replace the dynamic image control with a static image, and lay out the static image in a middle background image according to location information of the dynamic image control in an image to which the dynamic image control belongs, where a size of the static image is the same as a size of the dynamic image control.

With reference to any one of the third aspect or the possible implementations of the third aspect, in a fifth possible implementation of the third aspect, the location information is coordinates information.

With reference to any one of the third aspect or the possible implementations of the third aspect, in a sixth possible implementation of the third aspect, when stitching the first image and the second image into the third image according to the location information of the same control object, the processor is specifically configured to: obtain a first to-be-stitched image according to the first location information, and stitch the first to-be-stitched image and the second image into the third image; or obtain a second to-be-stitched image according to the second location information, and stitch the first image and the second to-be-stitched image into the third image.

According to the image stitching method provided in the embodiments of the present invention, the overlapped area or content of the first image and the second image can be accurately identified, and the first image and the second image are stitched into the third image according to location information of the overlapped area or content. The obtained third image has no overlapped content. Therefore, accuracy of image stitching is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The present invention may be applied to an electronic device. The electronic device may be a device with a display screen, such as a mobile phone, a tablet computer (PAD), a notebook computer, or a wearable device.

For ease of description, an electronic device 100 is used as an example for description in the embodiments of the present invention. It may be understood by persons skilled in the art that the embodiments of the present invention are also applicable to another apparatus, such as a handheld device, an in-vehicle device, a wearable device, a computing device, various types of user equipments (English: User Equipment, UE for short), a mobile station (English: Mobile station, MS for short), a terminal (terminal), or terminal equipment (Terminal Equipment).

Figure 1:
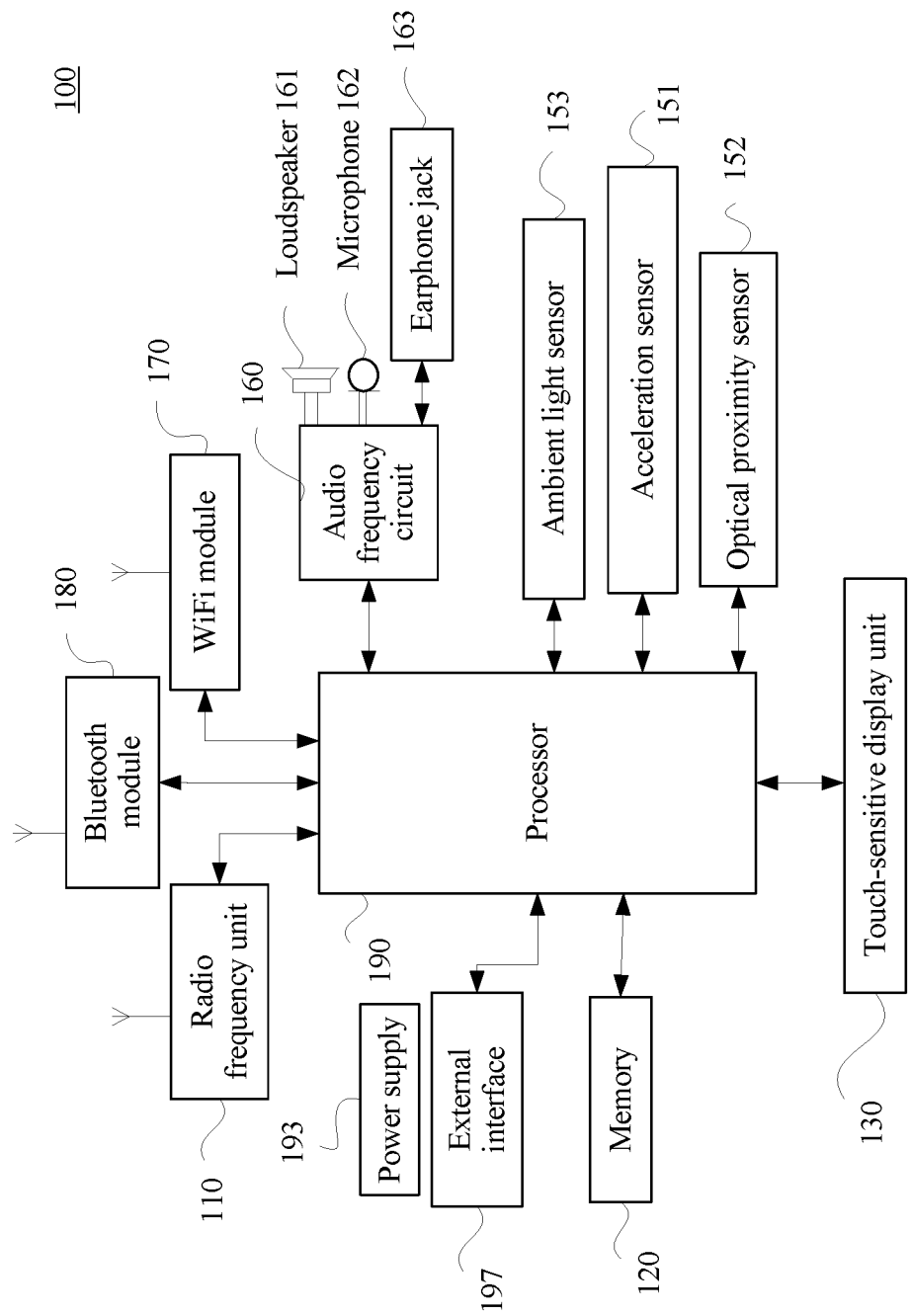
FIG. 1 is a schematic structural diagram of an electronic device according to an embodiment of the present invention.

FIG. 1 is a schematic structural diagram of an electronic device according to an embodiment of the present invention.

The electronic device 100 may include components such as a touch-sensitive display unit 130, an acceleration sensor 151, an optical proximity sensor 152, an ambient light sensor 153, a memory 120, a processor 190, a radio frequency unit 110, an audio frequency circuit 160, a loudspeaker 161, a microphone 162, a Wireless Fidelity (English: wireless fidelity, WiFi for short) module 170, a Bluetooth module 180, a power supply 193, and an external interface 197.

It may be understood by persons skilled in the art that FIG. 1 is merely an example of the electronic device, and is not intended to limited the electronic device, and the electronic device may include more or fewer components than components shown in the figure, or may combine some components, or may have different components.

For convenience, the touch-sensitive display unit 130 is sometimes referred to as a "touchscreen", or may be referred to as or called a touch-sensitive display system, or may be referred to as a display with a touch-sensitive surface (touch-sensitive surface). The display with the touch-sensitive surface includes the touch-sensitive surface and a display screen, and may display a screen interface, or may receive a touch action.

The touch-sensitive display unit 130 provides an input interface and an output interface between a device and a user. The touch-sensitive display unit 130 may collect a touch operation of the user performed on or near the touch-sensitive display unit 130, such as an operation of the user performed on the touch-sensitive display unit or near the touch-sensitive display unit by using any appropriate object such as a finger, a knuckle, or a stylus. The touch-sensitive display unit may detect the touch action performed on the touch-sensitive display unit, a grid capacitance of the touch-sensitive display unit, and touch point coordinates; send the touch action, the grid capacitance of the touch-sensitive display unit, and touch point coordinates information to the processor 190; and receive and execute a command sent by the processor 190. The touch-sensitive display unit 130 displays visual output. The visual output may include an image, a text, an icon, a video, and any combination thereof (collectively referred to as a "graph"). In some embodiments, the visual output may be corresponding to a first image, a second image, or a third image.

The touch-sensitive display unit 130 may use an LCD (liquid crystal display) technology, an LPD (light emitting polymer display) technology, or an LED (light emitting diode) technology. Another display technology may be used in another embodiment. The touch-sensitive display unit 130 may detect a touch and any movement or interruption of the touch by using any one of a plurality of known or to-be-developed touch sensing technologies and another proximity sensor array or another element configured to determine one or more touch points on the touch-sensitive display unit 130. The plurality of touch sensing technologies include but are not limited to capacitive, resistive, infrared, and surface acoustic wave technologies. In an example of an embodiment, a projected mutual-capacitance sensing technology is used.

In some embodiments, in addition to the touch-sensitive display unit, the electronic device 100 may include a touchpad (which is not shown) that is configured to activate or deactivate a specific function. In some embodiments, the touchpad is a touch-sensitive area of the device, the touch-sensitive area is different from the touch-sensitive display unit, and the touch-sensitive area does not display the visual output. The touchpad may be a touch-sensitive surface separated from the touch-sensitive display unit 130, or may be an extension part of a touch-sensitive surface formed by the touch-sensitive display unit.

The acceleration sensor 151 may detect a value of an acceleration in each direction (three axes generally). In addition, the acceleration sensor 151 may be further configured to detect a value and a direction of gravity when a terminal is static, and may be applied to an application for identifying a mobile phone posture (such as landscape-to-portrait switch, a related game, and magnetometer posture calibration), a function related to vibration identification (such as a pedometer or a knock), or the like. However, it can be understood that the acceleration sensor 151 is not a mandatory part of the electronic device 100, and may be omitted according to a requirement without changing essence of the present invention.

The electronic device 100 may further include one or more optical proximity sensors 152, configured to close and disable a touch function of the touch-sensitive surface when the electronic device 100 is relatively close to the user (for example, the electronic device 100 is near an ear when the user is making a call), so as to avoid a misoperation of the user on the touch-sensitive display unit. The electronic device 100 may further include one or more ambient light sensors 153, configured to keep the touch-sensitive display unit closed when the electronic device 100 is in a pocket of the user or in another dark area, so as to avoid unnecessary battery power consumption or a misoperation when the electronic device 100 is in a locked state. In some embodiments, the optical proximity sensor and the ambient light sensor may be integrated into one component, or may be used as two independent components. For the electronic device 100, another sensor such as a gyroscope, a barometer, a hygrometer, a thermometer, or an infrared sensor may be further configured, and details are not described herein. Although FIG. 1 shows the optical proximity sensor and the ambient light sensor, it can be understood that the optical proximity sensor and the ambient light sensor are not mandatory parts of the electronic device 100, and may be omitted according to a requirement without changing the essence of the present invention.

The memory 120 may be configured to store an instruction and data. The memory 120 may mainly include an instruction storage area and a data storage area. The data storage area may store an image, a control object, and location information of the control object. The instruction storage area may store an instruction required by an operating system and at least one function, and the like. The processor 190 may perform the following method according to the instruction. The specific method includes: obtaining a control object of a first image; obtaining a control object of a second image; identifying a same control object of the first image and the second image, and location information of the same control object, where the location information includes first location information and second location information, the first location information indicates a location of the same control object in the first image, and the second location information indicates a location of the same control object in the second image; and stitching the first image and the second image into a third image according to the location information of the same control object.

The processor 190 is a control center of the electronic device 100, and is connected to all parts of the entire mobile phone by using various interfaces and lines. The processor 190 runs or executes the instruction stored in the memory 120 and invokes the data stored in the memory 120 to execute various functions of the electronic device 100 and process data, so as to perform overall monitoring on the mobile phone. Optionally, the processor 190 may include one or more processing units. Preferably, an application processor and a modem processor may be integrated into the processor 190. The application processor mainly processes an operating system, a user interface, an application program, and the like; and the modem processor mainly processes wireless communications. It can be understood that the foregoing modem processor may not be integrated into the processor 190. In some embodiments, the processor and the memory may be implemented in a single chip. Alternatively, in some embodiments, the processor and the memory may be separately implemented in independent chips. In this embodiment of the present invention, the processor 190 is further configured to: invoke the instruction in the memory to accurately identify an overlapped area or content of the first image and the second image, and stitch the first image and the second image into the third image according to location information of the overlapped area or content. The obtained third image has no overlapped content. Therefore, accuracy of image stitching is improved.

The radio frequency unit 110 may be configured to: receive and send information, or receive and send a signal in a call process; specially, after receiving downlink information of a base station, send the downlink information to the processor 190 for processing; and in addition, send designed uplink data to the base station. Generally, an RF circuit includes but is not limited to an antenna, at least one amplifier, a transceiver, a coupler, a low noise amplifier (Low Noise Amplifier, LNA), a duplexer, and the like. In addition, the radio frequency unit 110 may further communicate with a network device and another device through wireless communication. The wireless communications may use any communications standard or protocol that includes but is not limited to a Global System for Mobile Communications (English: Global System for Mobile Communications, GSM for short), a general packet radio service (English: General Packet Radio Service, GPRS for short), Code Division Multiple Access (English: Code Division Multiple Access, CDMA for short), Wideband Code Division Multiple Access (English: Wideband Code Division Multiple Access, WCDMA for short), Long Term Evolution (English: Long Term Evolution, LTE for short), an email, a short message service (English: Short Message Service, SMS for short), or the like.

The audio frequency circuit 160, the loudspeaker 161, and the microphone 162 may provide an audio interface between the user and the electronic device 100. The audio frequency circuit 160 may transmit, to the loudspeaker 161, an electrical signal that is converted from received audio frequency data, and the loudspeaker 161 converts the electrical signal into a sound signal for output. In addition, the microphone 162 converts a collected sound signal into an electrical signal; and the audio frequency circuit 160 receives the electrical signal; converts the electrical signal into audio frequency data; outputs the audio frequency data to the processor 190 for processing; and then sends processed audio frequency data to, for example, another terminal by using the radio frequency unit 110; or outputs processed audio frequency data to the memory 120 for further processing. The audio frequency circuit may further include: an earphone jack 163, configured to provide a connection interface between the audio frequency circuit and an earphone.

WiFi belongs to a short-distance wireless transmission technology. The electronic device 100 may help, by using the WiFi module 170, the user receive and send an email, browse a web page, access streaming media, and the like. The WiFi module 170 provides the user with wireless broadband Internet access. Although FIG. 1 shows the WiFi module 170, it can be understood that the WiFi module 170 is not a mandatory part of the electronic device 100, and may be omitted according to a requirement without changing the essence of the present invention.

Bluetooth is a short-distance wireless communications technology. By using the Bluetooth technology, communication between mobile communications terminal devices such as a palmtop computer, a notebook computer, and a mobile phone can be effectively simplified, and communication between these devices and the Internet (Internet) can also be successfully simplified. Based on the Bluetooth module 180, data transmission between the electronic device 100 and the Internet becomes more fast and efficient. It paves the way for the wireless communications. The Bluetooth technology is an open solution that can implement voice and data wireless transmission. Although FIG. 1 shows the WiFi module 170, it can be understood that the WiFi module 170 is not a mandatory part of the electronic device 100, and may be omitted according to a requirement without changing the essence of the present invention.

The electronic device 100 further includes the power supply 193 (such as a battery) that supplies power to each component. Preferably, the power supply may be logically connected to the processor 190 by using a power supply management system, so as to implement functions such as charging management, discharging management, and power consumption management by using the power supply management system.

The electronic device 100 further includes the external interface 197. The external interface may be a standard micro USB interface or may be a multi-pin connector, and may be configured to connect the electronic device 100 to another apparatus for communication or may be configured to connect to a charger to charge the electronic device 100.

The electronic device 100 may further include a camera, a flashlight, and the like which are not shown though. Details are not described herein.

According to the following embodiments provided in the present invention, N images may be stitched, and N is a positive integer greater than or equal to 2. The following describes an image stitching method provided in the embodiments of the present invention by using an example in which N is 2. A processing manner between any two adjacent images in the N images is similar to a processing manner between the following two images.

Figure 2:
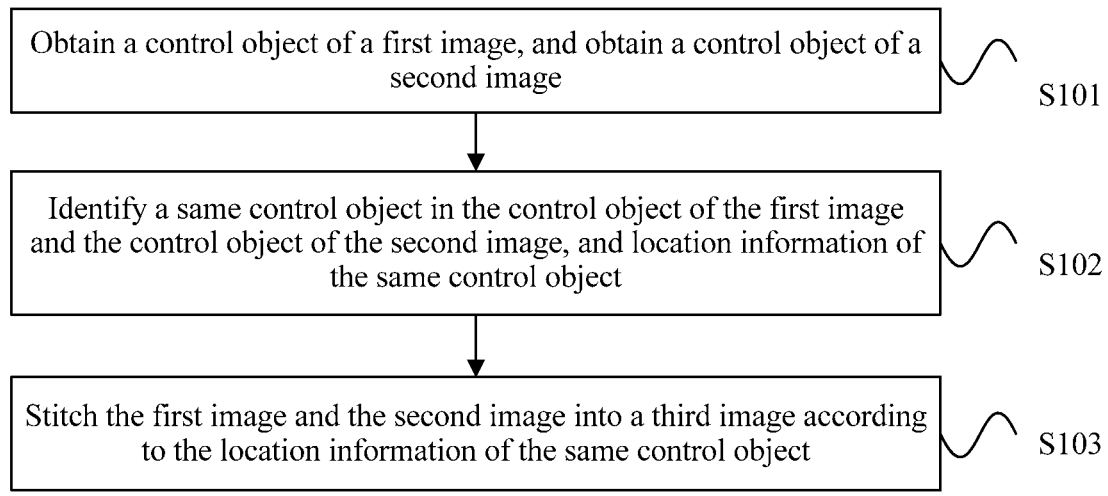
FIG. 2 is a flowchart of Embodiment 1 of an image stitching method according to the present invention.

FIG. 2 is a flowchart of Embodiment 1 of an image stitching method according to the present invention. As shown in FIG. 2, a method for stitching two images (a first image and a second image) is used as an example for description in this embodiment. The method in this embodiment may include:

obtaining a control object of the first image, and obtaining a control object of the second image (S101); identifying a the control object of the first image and the control object of the second image have a same control object and location information of the same control object (S102); and stitching the first image and the second image into a third image according to the location information of the same control object (S103).

S101. Obtain a control object of the first image, and obtain a control object of the second image.

In this embodiment, control objects of the two images that need to be stitched may be obtained. For ease of description, the first image and the second image are used as examples for description in this embodiment of the present invention. The first image and the second image may be any two images stored in a memory of an electronic device. The two images may be obtained by using a camera, and stored in the memory of the electronic device, or may be generated by a display interface of a display screen of the electronic device. If the image is generated by the display interface of the display screen of the electronic device, the image may be obtained by pressing a specific key of the electronic device, and stored in the memory of the electronic device. The control object is a component included in the image. The control object may include a text control object, a dynamic image control object, a static image control object, a background control object, and the like. For example, in an example of FIG. 3A, FIG. 3A includes the background control object, the text control object, and an emoticon control object.

An optional manner of obtaining the control object of the first image and the control object of the second image is as follows: first, identifying a control object type in the image, such as a text control type, a dynamic image control type, or a background control type; and then obtaining a control object corresponding to each control object type according to the identified control object type.

Figure 3A:
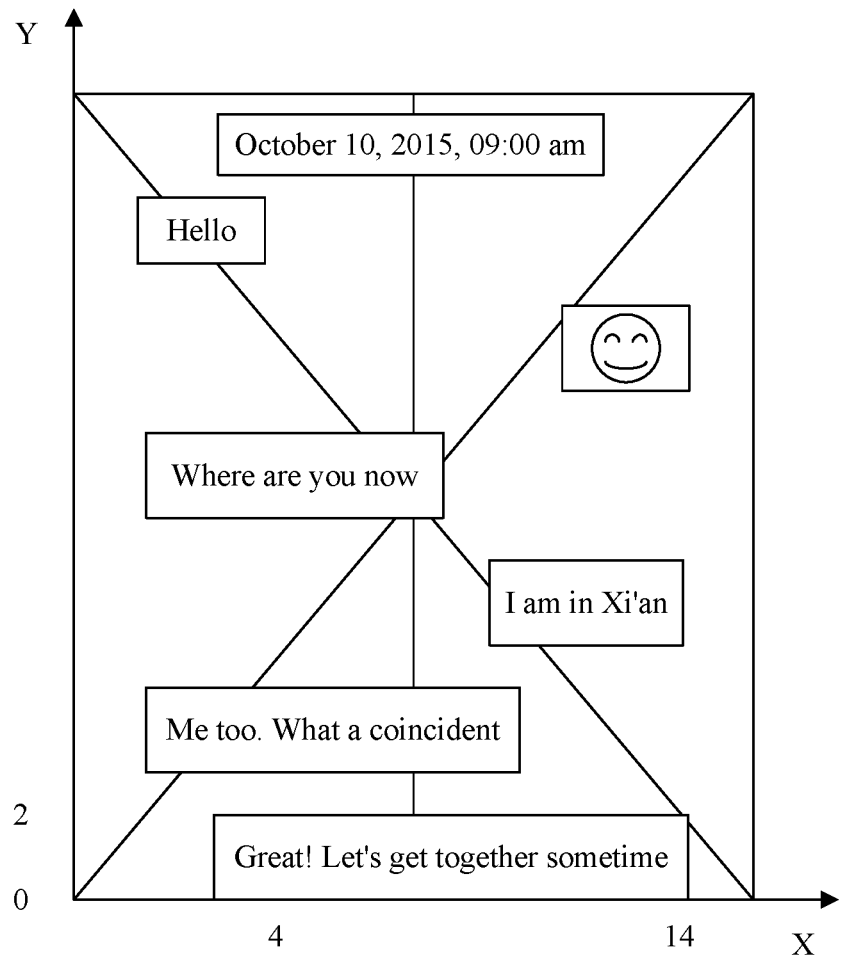
FIG. 3A is a schematic diagram of a first image according to an embodiment of the present invention.

FIG. 3A is a schematic diagram of a first image according to an embodiment of the present invention.

For example, in FIG. 3A, the first image shown in FIG. 3A includes: a text control object, including a time box, "Hello", "Where are you now", "I am in Xi'an", "Me too. What a coincident", and "Great! Let's get together sometime"; an emoticon control object; and a "*" type background control object. When a control object is obtained, a text control type, an emoticon control type, and a background control type included in the first image are first identified. Then a control object corresponding to each control object type is obtained according to the identified control object type. For example, control objects corresponding to the text control type include the timebox, "Hello", "Where are you now", "I am in Xi'an", "Me too. What a coincident", and "Great! Let's get together sometime"; a control object corresponding to the background control type is the "*" type background control; and a control object corresponding to the emoticon control type is a smiley face emoticon control.

Figure 3B:
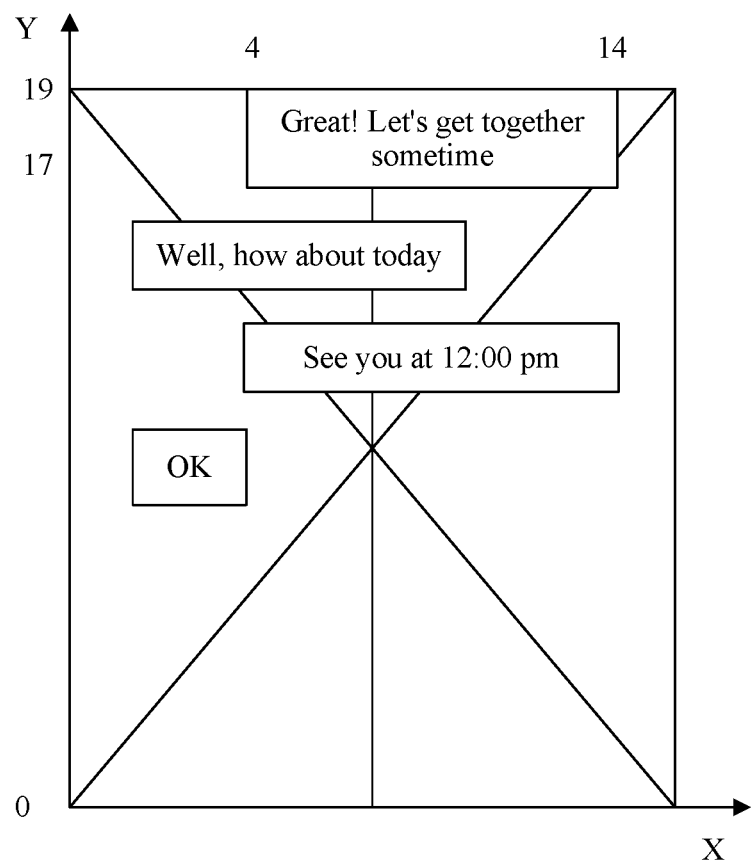
FIG. 3B is a schematic diagram of a second image according to an embodiment of the present invention.

FIG. 3B is a schematic diagram of a second image according to an embodiment of the present invention.

For example, in FIG. 3B, the second image shown in FIG. 3B includes: a text control object, including "Great! Let's get together sometime", "Well, how about today", "See you at 12:00 pm", and "OK"; and a "*" type background control object. When a control object is obtained, a text control type and a background control type included in the second image are first identified, and then a control object corresponding to each control object type is obtained according to the identified control object type. For example, control objects corresponding to the text control type include "Great! Let's get together sometime", "Well, how about today", "See you at 12:00 pm", and "OK"; and a control object corresponding to the background control type is the "*" type background control.

As shown in FIG. 3A and FIG. 3B, it can be understood that the background control object may include user-defined personalized setting information, for example, a personalized background interface such as a user-defined image, a flower, or a person image. For example, a user-defined "*" type personalized background control object is included in FIG. 3A and FIG. 3B.

In this embodiment, the control object type in the image can be identified at least in the following two implementation solutions: (1) The control object type in the image can be identified by using a tool of "accessibility service" provided by an Android platform. For example, in FIG. 3A, the text control type, the static image control type, and the background control type included in FIG. 3A are identified by using the tool of "accessibility service" provided by the Android platform. (2) A feature color is identified by using an image identification method, to determine a control object, and the control object type is determined with reference to a name of the control object. For example, a feature color of an instant messaging chat dialog box is green. When a feature color of green is identified by using the image identification method, an object with the green feature color is preliminarily determined as the control object, and a name of the control object with the green feature color is further obtained, to determine the control object type. For example, when a name of the obtained control object is TEXTVIEW, it can be determined, according to the name of the control object, that the control is a text control. If a name of the control is IMAGEVIW, it can be determined that the control is an image control.

S102. Identify a the control object of the first image and the control object of the second image have a same control object, and location information of the same control object.

In this embodiment, after the control object of the first image and the control object of the second image are obtained, the control object of the first image may be compared with the control object of the second image, to identify the same control object in the control object of the first image and the control object of the second image, and the location information of the same control object. The same control object exists in both the first image and the second image. In addition, the location information of the same control object includes first location information and second location information. The first location information indicates a location of the same control object in the first image, and the second location information indicates a location of the same control object in the second image. The same control object herein means that: in an example in which both two control objects are the text control objects, the two text control objects have the same text content and text boxes of the same color. It should be noted that, because a personalized control object affects accuracy of identifying the same control object of the two images, in a process of comparing the control object of the first image and the control object of the second image, a user-defined personalized control object is isolated. That is, the user-defined personalized control object is not used as an object for comparison. For example, in FIG. 3A and FIG. 3B, the background control object is a user-defined "*" type personalized control object. The background control object is not used in a process of identifying the same control object of the first image and the second image. The location information in this embodiment may be coordinates information. The location information may include the first location information and the second location information. The first location information may indicate coordinates information of the same control object in the first image. The second location information may indicate coordinates information of the same control object in the second image. Step S1021 to step S1023 describe in detail an implementation solution of identifying a same control of the two images.

For example, in the first image shown in FIG. 3A and the second image shown in FIG. 3B, "Great! Let's get together sometime" shown in FIG. 3A and "Great! Let's get together sometime" shown in FIG. 3B are the same control objects. If a horizontal coordinate of the first image is used as an x-axis, a vertical coordinate of the first image is used as a y-axis, and a lower left corner of the first image is used as an origin of coordinates, coordinates information of "Great! Let's get together sometime" in the first image is 4 to 14 on the x-axis, and 0 to 2 on the y-axis. If a horizontal coordinate of the second image is used as an x-axis, a vertical coordinate of the second image is used as a y-axis, and a lower left corner of the second image is used as an origin of coordinates, coordinates information of "Great! Let's get together sometime" in the second image is 4 to 14 on the x-axis, and 17 to 19 on the y-axis.

S103. Stitch the first image and the second image into a third image according to the location information of the same control object.

In this embodiment, after the location information of the same control object is determined, the first image and the second image are stitched into the third image according to the location information of the same control object. The location information may be the coordinates information. Preferably, the same control object is located at the bottom of the first image, and the same control object is located at the top of the second image. An area above the first location information in the first image is captured according to the location information of the same control object in the first image, that is, the first location information, to obtain a first to-be-stitched image. The first to-be-stitched image and the second image are stitched, to form the third image. Alternatively, an area below the second location information in the second image is captured according to the location information of the same control object in the second image, that is, the second location information, to obtain a second to-be-stitched image. The first image and the second to-be-stitched image are stitched, to form the third image.

Figure 3C:
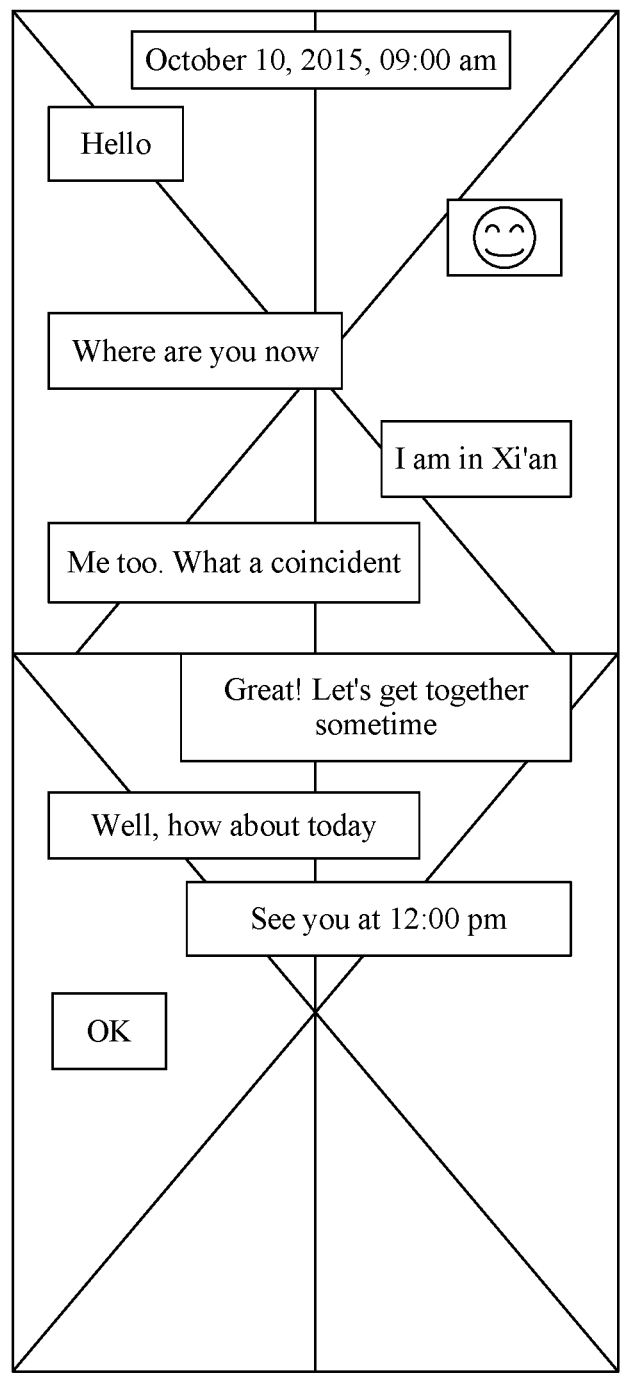
FIG. 3C is a schematic diagram of a third image according to an embodiment of the present invention.

FIG. 3C is a schematic diagram of a third image according to an embodiment of the present invention.

Figure 3D:
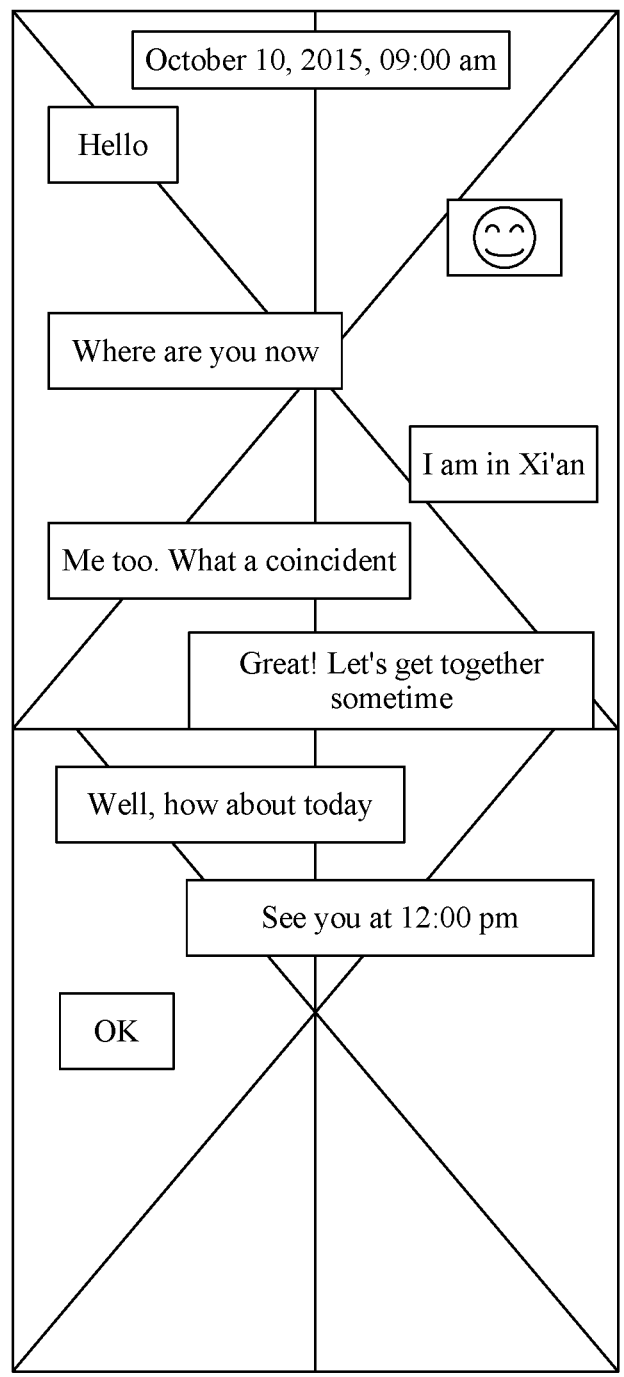
FIG. 3D is another schematic diagram of a third image according to an embodiment of the present invention.

FIG. 3D is another schematic diagram of a third image according to an embodiment of the present invention.

For example, in an example of FIG. 3A and FIG. 3B, after the text control object "Great! Let's get together sometime" is identified as the same control object of the first image and the second image, the coordinates information of the same control object in the first image shown in FIG. 3A is identified as 4 to 14 on the x-axis, and 0 to 2 on the y-axis. The coordinates information of the same control object in the second image shown in FIG. 3B is 4 to 14 on the x-axis, and 17 to 19 on the y-axis. An implementation of stitching the first image and the second image into the third image is as follows: capturing an area above a y-axis coordinate 2 in the first image, to obtain the first to-be-stitched image; and stitching the first to-be-stitched image and the second image, to form the third image (as shown in FIG. 3C). Another implementation includes: capturing an area below a y-axis coordinate 17 in the second image, to obtain the second to-be-stitched image; and stitching the first image and the second to-be-stitched image, to form the third image (as shown in FIG. 3D).

According to the image stitching method provided in this embodiment, the control object of the first image and the control object of the second image are respectively obtained, and then the same control object of the first image and the second image and the location information of the same control object are identified, so that location information of the overlapped area or content in the first image may be accurately identified. The first image and the second image are stitched into the third image according to the overlapped area or content, and the obtained third image has no overlapped content. Therefore, accuracy of image stitching is improved.

An implementation of S102 is described in detail, and a specific implementation process is shown as follows:

S1021. Obtain location information of the control object of the first image in the first image, and obtain location information of the control object of the second image in the second image.

In this embodiment, the location information may be the coordinates information, and the coordinates information includes a horizontal coordinate and a vertical coordinate. For example, the lower left corner of the first image is used as the origin of coordinates, and a horizontal coordinate and a vertical coordinate of the control object of the first image that are relative to the origin of coordinates may be obtained.

S1022. Obtain a first middle image according to the obtained control object of the first image and location information of the control object of the first image in the first image; and obtain a second middle image according to the obtained control object of the second image and location information of the control object of the second image in the second image.

In this embodiment, after the control object of the first image and the location information of the control object in the first image are obtained, the control object of the first image is laid out in a solid-color middle background image according to the location information of the control object of the first image in the first image, to obtain the first middle image. It should be noted that, to resolve a problem that personalized information such as a background image affects identification of the same control object of the two images, a first middle background image does not include a control object with personalized information in the first image, such as a background control object of the first image. Further, the middle background image in this embodiment is a solid-color background image. A size of the first image is the same as a size of the first middle image. The size herein is a length and a width. That is, a length of the first image is the same as a length of the first middle image, and a width of the first image is the same as a width of the first middle image. The location information of the control object of the first image in the first image is the same as location information of the control object in the first middle image. It can be understood that a difference between the first image and the first middle image is that the personalized information such as the background image is removed from the first middle image on a basis of the first image.

Figure 4A:
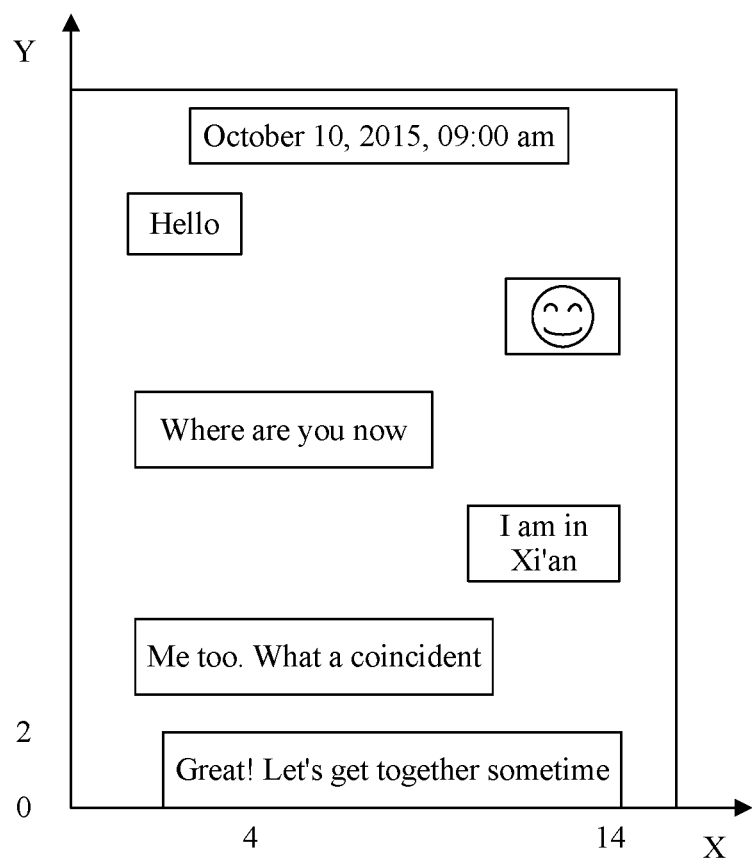
FIG. 4A is a schematic diagram of a first middle image according to an embodiment of the present invention.

FIG. 4A is a schematic diagram of a first middle image according to an embodiment of the present invention. For example, the lower left corner of the first image is used as the origin of coordinates, coordinates information of a control object in the first image is 4 to 14 on the x-axis, and 0 to 2 on the y-axis, and coordinates information of the control object in the first middle image also is 4 to 14 on the x-axis, and 0 to 2 on the y-axis. The control object of the first image shown in FIG. 3A is laid out in the middle background image, to obtain the first middle image shown in FIG. 4A. A background image of the first middle image is the solid-color background image.

After the control object of the second image and the location information of the control object in the second image are obtained, the control object of the second image is laid out in a solid-color middle background image according to the location information of the control object of the second image in the second image (which is the same as the step of laying out the control object of the first image in the first middle background image), to obtain the second middle image. It should be noted that, to resolve the problem that personalized information such as a background image affects identification of the same control object of the two images, a second middle background image does not include a control object with personalized information of the second image, such as a background control object of the second image. Further, the middle background image in this embodiment is a solid-color background image. A size of the second image is the same as a size of the second middle image. The size herein is a length and a width. That is, a length of the second image is the same as a length of the second middle image, and a width of the second image is the same as a width of the second middle image. The location information of the control object of the second image in the second image is the same as location information of the control object in the second middle image. It can be understood that a difference between the second image and the second middle image is that the personalized information such as the background image is removed from the second middle image on a basis of the second image.

Figure 4B:
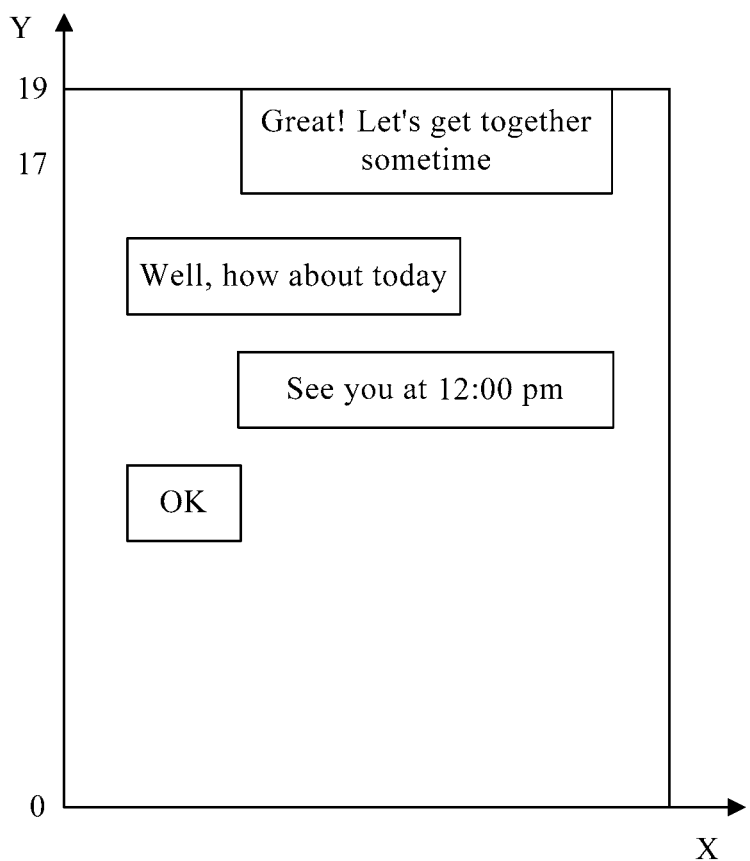
FIG. 4B is a schematic diagram of a second middle image according to an embodiment of the present invention.

FIG. 4B is a schematic diagram of a second middle image according to an embodiment of the present invention. For example, the lower left corner of the second image is used as the origin of coordinates, coordinates information of a control object in the second image is 4 to 14 on the x-axis, and 17 to 19 on the y-axis, and coordinates information of the control object in the second middle image also is 4 to 14 on the x-axis, and 17 to 19 on the y-axis. The control object of the second image shown in FIG. 3B is laid out in the middle background image, to obtain the second middle image shown in FIG. 4B. A background image of the second middle image is the solid-color background image.

The background image of the first middle image is the same as the background image of the second middle image.

S1023. Compare the first middle image with the second middle image, and determine a same control object of the first middle image and the second middle image, and location information of the same control object.

In this embodiment, after the first middle image and the second middle image are obtained, an image comparison is performed on the first middle image and the second middle image. For example, the first middle image may be compared with the second middle image pixel by pixel, to determine the same control object of the first middle image and the second middle image. Therefore, the location information of the same control object of the two images is obtained. For example, "Great! Let's get together sometime" may be determined as the same control object of the first middle image and the second middle image by comparing the first middle image shown in FIG. 4A and the second middle image shown in FIG. 4B pixel by pixel. Coordinates of the same control object in the first middle image are 4 to 14 on the x-axis, and 0 to 2 on the y-axis, and coordinates of the same control object in the second middle image are 4 to 14 on the x-axis, and 17 on 19 in the y-axis.

According to the image stitching method provided in this embodiment, the control objects of the two images are laid out in the same solid-color background image, so that the user-defined personalized background image is prevented from affecting determining of the same control object. Therefore, the stitched image has no overlapped content, accuracy of image stitching is improved.

Figures 5A, 5B:
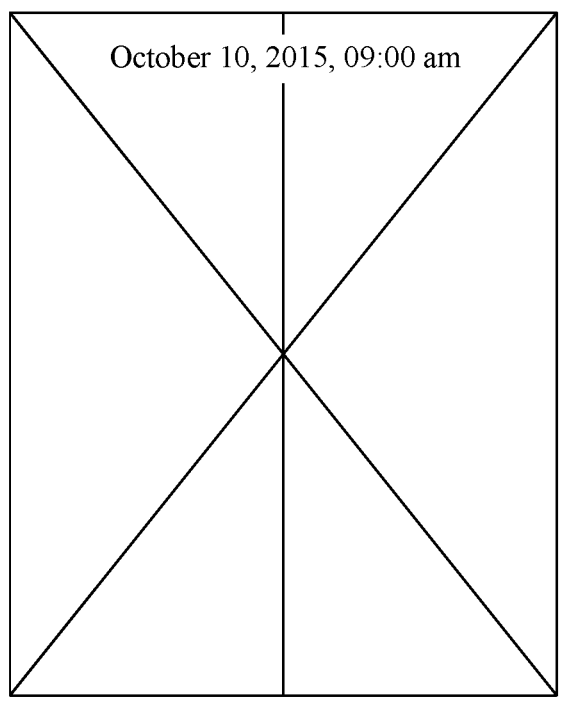
FIG. 5A is a schematic diagram of laying out a control object shown in FIG. 3B in a middle background image according to an embodiment of the present invention.
FIG. 5B is a schematic diagram of a transparent text control according to an embodiment of the present invention.

In Embodiment 3 of the method in the present invention, this embodiment describes S1022 in detail based on Embodiment 2 of the method in the present invention. Any control object in the control object of the first image and the control object of the second image is used as an example for description in this embodiment, and another control object is similar. A specific process is as follows:

FIG. 5A is a schematic diagram of laying out a control object shown in FIG. 3B in a middle background image according to an embodiment of the present invention. In a first possible implementation, if the control object is a text control, a text of the text control is extracted, and the text of the text control is laid out in the middle background image. Coordinates information of the text in the middle background image is the same as coordinates information of the text in an image (the first image or the second image) to which the text belongs. As shown in FIG. 5A, the control object shown in FIG. 3B is laid out in the middle background image.

In a second possible implementation, if the control object is a text control, and the text control is a non-transparent text control, the text control is laid out in the middle background image. The non-transparent text control means that a background of an image to which the text control belongs cannot be seen through the text control. Coordinates information of the text control in the middle background image is the same as coordinates information of the text control in the image (the first image or the second image) to which the text control belongs. As shown in FIG. 4B, the control object shown in FIG. 3B is laid out in the middle background image.

Figures 5C, 5D:
FIG. 5C is a schematic diagram of laying out a transparent text control in a middle background image according to an embodiment of the present invention.
FIG. 5D is another schematic diagram of laying out a transparent text control in a middle background image according to an embodiment of the present invention.

FIG. 5C is a schematic diagram of laying out a transparent text control in a middle background image according to an embodiment of the present invention. The transparent text control means that a background of an image to which the text control belongs can be seen through the text control. If the control object is a text control, and the text control is the transparent text control, a text of the text control is extracted, and the extracted text is laid out in the middle background image. Coordinates information of the text in the middle background image is the same as coordinates information of the text in an image to which the text belongs. As shown in FIG. 5C, a control object shown in FIG. 5B is laid out in the middle background image.

FIG. 5D is another schematic diagram of laying out a transparent text control in a middle background image according to an embodiment of the present invention. If the control object is a text control, and the text control is the transparent text control, the text control is replaced with a color block image, and the color block image is laid out in the middle background image. A size of the color block image is the same as that of the text control, that is, a length of the color block image is the same as a length of the text control, and a width of the color block image is the same as a width of the text control. Coordinates information of the color block image in the middle background image is the same as coordinates information of the text control in an image to which the text control belongs. As shown in FIG. 5D, the control object shown in FIG. 4B is laid out in the middle background image. The transparent text control in FIG. 5B is replaced with a black color block image shown in FIG. 5D.

In a third possible implementation, if the control object is a dynamic image control, such as a dynamic emoticon or a video, the dynamic image control is replaced with a static image, and the static image is laid out in the middle background image. A size of the static image is the same as that of the dynamic image control, that is, a length of the static image is the same as a length of the dynamic image control, and a width of the static image is the same as a width of the dynamic image control. Coordinates information of the static image in the middle background image is the same as coordinates information of the dynamic image control in an image to which the dynamic image control belongs. Optionally, the static image may also be a color block image.

Figure 6:
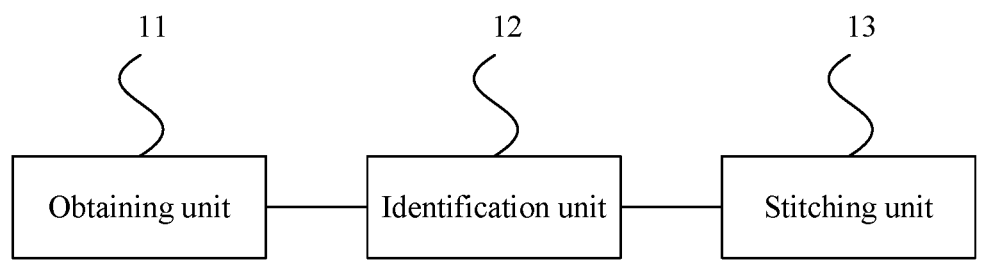
FIG. 6 is a schematic structural diagram of an electronic device according to Embodiment 1 of the present invention.

FIG. 6 is a schematic structural diagram of an electronic device according to Embodiment 1 of the present invention. As shown in FIG. 6, the electronic device in this embodiment may include an obtaining unit 11, an identification unit 12, and a stitching unit 13. The obtaining unit 11 is configured to: obtain a control object of a first image, and obtain a control object of a second image. The identification unit 12 is configured to identify a same control object of the first image and the second image, and location information of the same control object, where the location information includes first location information and second location information, the first location information indicates a location of the same control object in the first image, and the second location information indicates a location of the same control object in the second image. The stitching unit 13 is configured to stitch the first image and the second image into a third image according to the location information of the same control object.

In some embodiments, the identification unit 12 is specifically configured to: obtain location information of the control object of the first image in the first image; obtain a first middle image according to the obtained control object of the first image and the location information of the control object of the first image in the first image; obtain location information of the control object of the second image in the second image; obtain a second middle image according to the obtained control object of the second image and the location information of the control object of the second image in the second image; compare the first middle image with the second middle image, and determine a same control object of the first middle image and the second middle image; determine location information of the same control object in the first middle image; and determine location information of the same control object in the second middle image.

In some embodiments, the first middle image has a solid-color background, the second middle image has a solid-color background, and the background of the first middle image is the same as the background of the second middle image.

In some embodiments, a size of the first middle image is the same as that of the first image, and a size of the second middle image is the same as that of the second image. The location information of the control object of the first image is the same as location information of a control object of the first middle image, and the location information of the control object of the second image is the same as location information of a control object of the second middle image.

In some embodiments, when obtaining the first middle image according to the obtained control object of the first image and the location information of the control object of the first image in the first image, or obtaining the second middle image according to the obtained control object of the second image and the location information of the control object of the second image in the second image, the identification unit 12 is specifically configured to:

if the control object is a text control, extract a text of the text control, and lay out the text of the text control in a middle background image according to location information of the control object in an image to which the control object belongs; or if the control object is a non-transparent text control, lay out the non-transparent text control in a middle background image according to location information of the control object in an image to which the control object belongs; or if the control object is a transparent text control, extract a text of the transparent text control, and lay out the text of the transparent text control in a middle background image according to location information of the control object in an image to which the control object belongs, or replace the transparent text control with a color block image, and lay out the color block image in a middle background image according to location information of the text control in an image to which the text control belongs, where a size of the color block image is the same as a size of a non-transparent text control; or if the control object is a dynamic image control, replace the dynamic image control with a static image, and lay out the static image in a middle background image according to location information of the dynamic image control in an image to which the dynamic image control belongs, where a size of the static image is the same as a size of the dynamic image control.

In some embodiments, the location information is coordinates information.

In some embodiments, the stitching unit 13 is specifically configured to: obtain a first to-be-stitched image according to the first location information, and stitch the first to-be-stitched image and the second image into the third image; or obtain a second to-be-stitched image according to the second location information, and stitch the first image and the second to-be-stitched image into the third image.

The electronic device in this embodiment may be configured to execute the technical solution in each method embodiment of the present invention, and implementation principles and technical effects of the electronic device are similar, and details are not described herein again.

Figure 7:
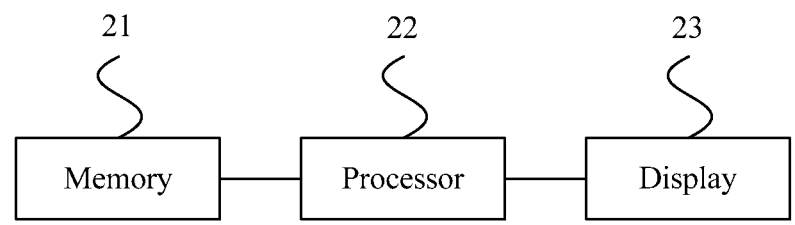
FIG. 7 is a schematic structural diagram of an electronic device according to Embodiment 2 of the present invention.

FIG. 7 is a schematic structural diagram of an electronic device according to Embodiment 2 of the present invention. As shown in FIG. 7, the electronic device in this embodiment may include a memory 21, a processor 22, and a display 23. The memory 21 is configured to store an instruction. The processor 22 is configured to invoke the instruction stored in the memory 21 to perform the following steps: obtaining a control object of a first image; obtaining a control object of a second image; identifying a same control object of the first image and the second image, and location information of the same control object, where the location information includes first location information and second location information; the first location information indicates a location of the same control object in the first image; and the second location information indicates a location of the same control object in the second image; and stitching the first image and the second image into a third image according to the location information of the same control object. The display 23 is configured to display the first image, the second image, and the third image.

In some embodiments, when identifying the same control object of the first image and the second image, and the location information of the same control object, the processor 22 is specifically configured to: obtain location information of the control object of the first image in the first image; obtain a first middle image according to the obtained control object of the first image and the location information of the control object of the first image in the first image; obtain location information of the control object of the second image in the second image; obtain a second middle image according to the obtained control object of the second image and the location information of the control object of the second image in the second image; compare the first middle image with the second middle image, and determine a same control object of the first middle image and the second middle image; determine location information of the same control object in the first middle image; and determine location information of the same control object in the second middle image.

In some embodiments, the first middle image has a solid-color background, the second middle image has a solid-color background, and the background of the first middle image is the same as the background of the second middle image.

In some embodiments, a size of the first middle image is the same as that of the first image, and a size of the second middle image is the same as that of the second image. The location information of the control object of the first image is the same as location information of a control object of the first middle image, and the location information of the control object of the second image is the same as location information of a control object of the second middle image.

In some embodiments, when obtaining the first middle image according to the obtained control object of the first image and the location information of the control object of the first image in the first image, or obtaining the second middle image according to the obtained control object of the second image and the location information of the control object of the second image in the second image, the processor 22 is specifically configured to:

if the control object is a text control, extract a text of the text control, and lay out the text of the text control in a middle background image according to location information of the control object in an image to which the control object belongs; or if the control object is a non-transparent text control, lay out the non-transparent text control in a middle background image according to location information of the control object in an image to which the control object belongs; or if the control object is a transparent text control, extract a text of the transparent text control, and lay out the text of the transparent text control in a middle background image according to location information of the control object in an image to which the control object belongs, or replace the transparent text control with a color block image, and lay out the color block image in a middle background image according to location information of the text control in an image to which the text control belongs, where a size of the color block image is the same as a size of a non-transparent text control; or if the control object is a dynamic image control, replace the dynamic image control with a static image, and lay out the static image in a middle background image according to location information of the dynamic image control in an image to which the dynamic image control belongs, where a size of the static image is the same as a size of the dynamic image control.

In some embodiments, the location information is coordinates information.

In some embodiments, when stitching the first image and the second image into the third image according to the location information of the same control object, the processor 22 is specifically configured to: obtain a first to-be-stitched image according to the first location information, and stitch the first to-be-stitched image and the second image into the third image; or obtain a second to-be-stitched image according to the second location information, and stitch the first image and the second to-be-stitched image into the third image.

The electronic device in this embodiment may be configured to implement the technical solutions in each method embodiment of the present invention. The implementation principles and technical effects are similar, and are not further described herein again.

Persons of ordinary skill in the art may understand that all or a part of the steps of the method embodiments may be implemented by a program instructing relevant hardware. The program may be stored in a non-volatile computer readable storage medium. When the program runs, steps of the method embodiments are performed. The foregoing storage medium includes: any medium that can store program code, such as a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image stitching method, wherein the method comprises:
   obtaining a control object of a first image;
   obtaining a control object of a second image;
   identifying a same control object common to the first image and the second image, and location information of the same control object; and
   stitching the first image and the second image into a third image according to the location information of the same control object; wherein
      the location information comprises first location information and second location information, the first location information indicating a location of the same control object in the first image, and the second location information indicating a location of the same control object in the second image;
   wherein the identifying the same control object of common to the first image and the second image, and location information of the same control object comprises:
      obtaining location information of the control object of the first image in the first image;
      obtaining a first middle image according to the obtained control object of the first image and the location information of the control object of the first image in the first image;
      obtaining location information of the control object of the second image in the second image;
      obtaining a second middle image according to the obtained control object of the second image and the location information of the control object of the second image in the second image;
      comparing the first middle image with the second middle image, and determining a same control object common to the first middle image and the second middle image;
      determining location information of the same control object in the first middle image; and
      determining location information of the same control object in the second middle image.

2. The method according to claim 1, wherein the first middle image has a solid-color background, the second middle image has a solid-color background, and the background of the first middle image is the same as the background of the second middle image.

3. The method according to claim 1, wherein a size of the first middle image is the same as a size of the first image, and a size of the second middle image is the same as a size of the second image;
   the location information of the control object of the first image is the same as location information of a control object of the first middle image; and
   the location information of the control object of the second image is the same as location information of a control object of the second middle image.

4. The method according to claim 1, wherein the obtaining a first middle image according to the obtained control object of the first image and the location information of the control object of the first image in the first image, or the obtaining a second middle image according to the obtained control object of the second image and the location information of the control object of the second image in the second image comprises:
   if the control object is a text control, extracting a text of the text control, and laying out the text of the text control in a middle background image according to location information of the control object in an image to which the control object belongs;
   if the control object is a non-transparent text control, laying out the non-transparent text control in a middle background image according to location information of the control object in an image to which the control object belongs; or if the control object is a transparent text control, extracting a text of the transparent text control, and laying out the text of the transparent text control in a middle background image according to location information of the control object in an image to which the control object belongs, or replacing the transparent text control with a color block image, and laying out the color block image in a middle background image according to location information of the text control in an image to which the text control belongs, wherein a size of the color block image is the same as a size of the non-transparent text control; and if the control object is a dynamic image control, replacing the dynamic image control with a static image, and laying out the static image in a middle background image according to location information of the dynamic image control in an image to which the dynamic image control belongs, wherein a size of the static image is the same as a size of the dynamic image control.

5. The method according to claim 1, wherein the location information includes coordinates information.

6. The method according to claim 1, wherein stitching the first image and the second image into a third image according to the location information of the same control object comprises:
obtaining a first to-be-stitched image according to the first location information, and stitching the first to-be-stitched image and the second image into the third image; or
obtaining a second to-be-stitched image according to the second location information, and stitching the first image and the second to-be-stitched image into the third image.

7. An electronic device, comprising:
an obtaining unit, configured to: obtain a control object of a first image, and obtain a control object of a second image;
an identification unit, configured to:
identify a same control object common to the first image and the second image, and location information of the same control object, wherein
the location information comprises first location information and second location information, the first location information indicating a location of the same control object in the first image, and the second location information indicating a location of the same control object in the second image;
wherein the identification unit is specifically configured to obtain location information of the control object of the first image in the first image; obtain a first middle image according to the obtained control object of the first image and the location information of the control object of the first image in the first image; obtain location information of the control object of the second image in the second image; obtain a second middle image according to the obtained control object of the second image and the location information of the control object of the second image in the second image; compare the first middle image with the second middle image, and determine a same control object of the first middle image and the second middle image; determine location information of the same control object in the first middle image; and determine location information of the same control object in the second middle image; and
a stitching unit, configured to stitch the first image and the second image into a third image according to the location information of the same control object.

8. The electronic device according to claim 7, wherein the first middle image has a solid-color background, the second middle image has a solid-color background, and the background of the first middle image is the same as the background of the second middle image.

9. The electronic device according to claim 7, wherein a size of the first middle image is the same as a size of the first image, and a size of the second middle image is the same as a size of the second image;
the location information of the control object of the first image is the same as location information of a control object of the first middle image; and
the location information of the control object of the second image is the same as location information of a control object of the second middle image.

10. The electronic device according to claim 7, wherein when obtaining the first middle image according to the obtained control object of the first image and the location information of the control object of the first image in the first image, or obtaining the second middle image according to the obtained control object of the second image and the location information of the control object of the second image in the second image, the identification unit is specifically configured to:
if the control object is a text control, extract a text of the text control, and lay out the text of the text control in a middle background image according to location information of the control object in an image to which the control object belongs;
if the control object is a non-transparent text control, lay out the non-transparent text control in a middle background image according to location information of the control object in an image to which the control object belongs; or if the control object is a transparent text control, extract a text of the transparent text control, and lay out the text of the transparent text control in a middle background image according to location information of the control object in an image to which the control object belongs, or replace the transparent text control with a color block image, and lay out the color block image in a middle background image according to location information of the text control in an image to which the text control belongs, wherein a size of the color block image is the same as a size of the non-transparent text control; and
if the control object is a dynamic image control, replace the dynamic image control with a static image, and lay out the static image in a middle background image according to location information of the dynamic image control in an image to which the dynamic image control belongs, wherein a size of the static image is the same as a size of the dynamic image control.

11. The electronic device according to claim 7, wherein the location information is coordinates information.

12. The electronic device according to claim 7, wherein the stitching unit is specifically configured to: obtain a first to-be-stitched image according to the first location information, and stitch the first to-be-stitched image and the second image into the third image; or obtain a second to-be-stitched image according to the second location information, and stitch the first image and the second to-be-stitched image into the third image.

13. An electronic device, comprising:
a memory, configured to store an instruction; and
a processor, configured to invoke the instruction stored in the memory to perform the following steps:
obtaining a control object of a first image;
obtaining a control object of a second image;
identifying a same control object common to the first image and the second image, and location information of the same control object; and
stitching the first image and the second image into a third image according to the location information of the same control object; and
a display, configured to display the first image, the second image, and the third image; wherein the location information comprises first location information and second location information, the first location information indicating a location of the same control object in the first image, and the second location information indicating a location of the same control object in the second image;

wherein when identifying the control objects of the same control object common to the first image and the second image are the same control object, and the location information of the same control object, the processor is specifically configured to:

obtaining location information of the control object of the first image in the first image;

obtaining a first middle image according to the obtained control object of the first image and the location information of the control object of the first image in the first image;

obtaining location information of the control object of the second image in the second image;

obtaining a second middle image according to the obtained control object of the second image and the location information of the control object of the second image in the second image;

comparing the first middle image with the second middle image, and determine a same control object of the first middle image and the second middle image;

determining location information of the same control object in the first middle image;

determining location information of the same control object in the second middle image.

14. The electronic device according to claim 13, wherein the first middle image has a solid-color background, the second middle image has a solid-color background, and the background of the first middle image is the same as the background of the second middle image.

15. The electronic device according to claim 13, wherein a size of the first middle image is the same as a size of the first image, and a size of the second middle image is the same as a size of the second image;

the location information of the control object of the first image is the same as location information of a control object of the first middle image; and the location information of the control object of the second image is the same as location information of a control object of the second middle image.

16. The electronic device according to claim 13, wherein when obtaining the first middle image according to the obtained control object of the first image and the location information of the control object of the first image in the first image, or obtaining the second middle image according to the obtained control object of the second image and the location information of the control object of the second image in the second image, the processor is specifically configured to:

if the control object is a text control, extract a text of the text control, and lay out the text of the text control in a middle background image according to location information of the control object in an image to which the control object belongs;

if the control object is a non-transparent text control, lay out the non-transparent text control in a middle background image according to location information of the control object in an image to which the control object belongs; or if the control object is a transparent text control, extract a text of the transparent text control, and lay out the text of the transparent text control in a middle background image according to location information of the control object in an image to which the control object belongs, or replace the transparent text control with a color block image, and lay out the color block image in a middle background image according to location information of the text control in an image to which the text control belongs, wherein a size of the color block image is the same as a size of the non-transparent text control; and if the control object is a dynamic image control, replace the dynamic image control with a static image, and lay out the static image in a middle background image according to location information of the dynamic image control in an image to which the dynamic image control belongs, wherein a size of the static image is the same as a size of the dynamic image control.

17. The electronic device according to claim 13, wherein the location information is coordinates information.

* * * * *